July 22, 1969

E. R. PERRY 3,457,428

UNDERGROUND RESIDENTIAL DISTRIBUTION
SYSTEM FOR ELECTRIC POWER
Filed Dec. 1, 1966

Inventor
Elijah R. Perry
By Thomas F. Kirby
Attorney

United States Patent Office 3,457,428
Patented July 22, 1969

3,457,428
UNDERGROUND RESIDENTIAL DISTRIBUTION SYSTEM FOR ELECTRIC POWER
Elijah R. Perry, Portland, Oreg., assignor to Allis-Chalmers Manufacturing Company, Milwaukee, Wis.
Filed Dec. 1, 1966, Ser. No. 598,346
Int. Cl. H02j 3/46
U.S. Cl. 307—17       5 Claims

ABSTRACT OF THE DISCLOSURE

An underground electrical distribution system for supplying power to a subdivision of about 50 to 150 homes comprises a substation supplying power at about 15 kv. through a first underground cable to an underground transformer near the subdivision having an output of 2 to 5 kv. One or more second underground cables lead from the transformer to the vicinity of homes. A third underground cable is connected between a step down transformer (2 to 5 kv./240/120) on each home and the second cable. The third cable is provided with a clamp-on or piercing type connector for attaching it to the second cable.

---

Figure 1:
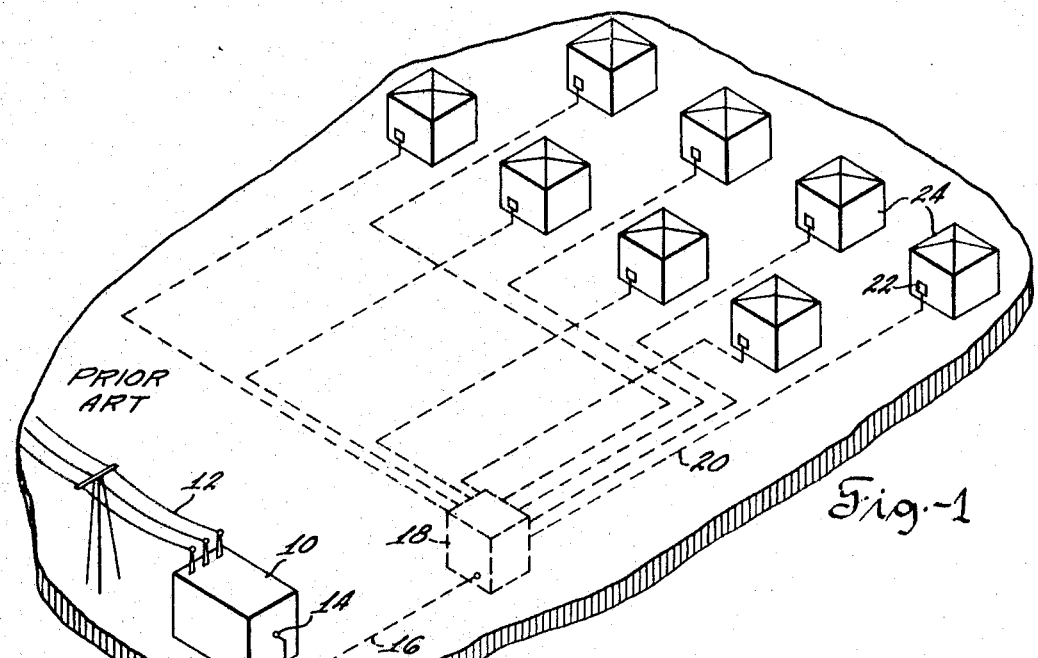

This invention relates generally to underground residential distribution (URD) systems for electric power. More particularly, it relates to improved URD systems which are more efficiently and economically installed and have a larger power handling capacity than heretofore.

In the electrical power field at the residential level, there is a trend away from overhead lines, poles and pole-mounted devices, and toward URD systems having underground cables, transformers, switches and related devices. The reason is that overhead systems are unaesthetic and URD systems are thought to have greater potential for cost reduction in manufacture, installation and servicing.

In some existing conventional URD systems, an aboveground substation supplies power at 15,000 volts (15 kv.). An underground multiconductor cable capable of handling 15 kv. has one end connected to the substation and has its other end connected to an underground transformer which effects a step down from 15 kv. to about 240 volts. The latter transformer is usually adapted to serve a maximum of about eight buildings, such as dwelling units or homes. Individual underground cables each having a 240 volt rating connect each home to the latter transformer.

One major disadvantage is that accommodations must be made in the ground for a transformer of sufficient size to handle eight houses, even though only one house is presently constructed. Also, the 240 volt secondary cables are more expensive than the higher voltage primary cable. There is also a possibility of losing service to eight homes when a transformer failure occurs. Since most subdivisions tend to have about 50 to 150 homes, it becomes expensive to provide enough electric service on this basis and it is desirable to provide more economical systems to provide equivalent or even improved service.

In a system according to the present invention, there is provided an aboveground substation having 15 kv. output terminals. An underground cable rated at 15 kv. is connected between this terminal and an underground distribution transformer having a step down-ratio of 15 kv. to about 2 to 5 kv. which is located in the general vicinity of a subdivision having, for example, about 50 to 150 homes. A second underground cable or a plurality of them are connected to the transformer and disposed underground relatively close to all homes. Each second cable may have a fuse in circuit therewith. If preferred, and for convenience in making connections, the second cable or cables may be laid so that spaced apart sections thereof are looped relatively close to the surface of the earth wherever it is anticipated that a connection will be made to a home and the looped portion may be covered with a removable protective cover which also helps to locate it. A third underground cable extends between each second cable and each home it serves and is attached at one end to the second cable by means of a special clamp-on type connector which pierces the insulation of the second cable. The other end of the third cable connects to a second transformer having a step-down ratio of 2 to 5 kv. down to 240 volts which may be mounted in or near the dwelling unit. If preferred, a meter and fuse may be mounted in circuit with the third cable relatively near the home or the clamp-on connector.

It is an object of the present invention to provide a URD system of the aforesaid character which is efficiently and economically installed and eliminates the need for a large number of heavy duty transformers.

Another object is to provide a URD system of the aforesaid character which provides in advance for a large number of existing or projected homes.

Another object is to provide a URD system of the aforesaid character which provides a novel means for locating the position where connections may be made to a cable.

Another object is to provide a URD system having improved means for making connections.

Other objects and advantages of the invention will hereinafter appear.

The accompanying drawing illustrates a preferred embodiment of the invention but it is to be understood that the embodiment illustrated is susceptible of modifications with respect to details thereof without departing from the scope of the appended claims.

Figure 2:
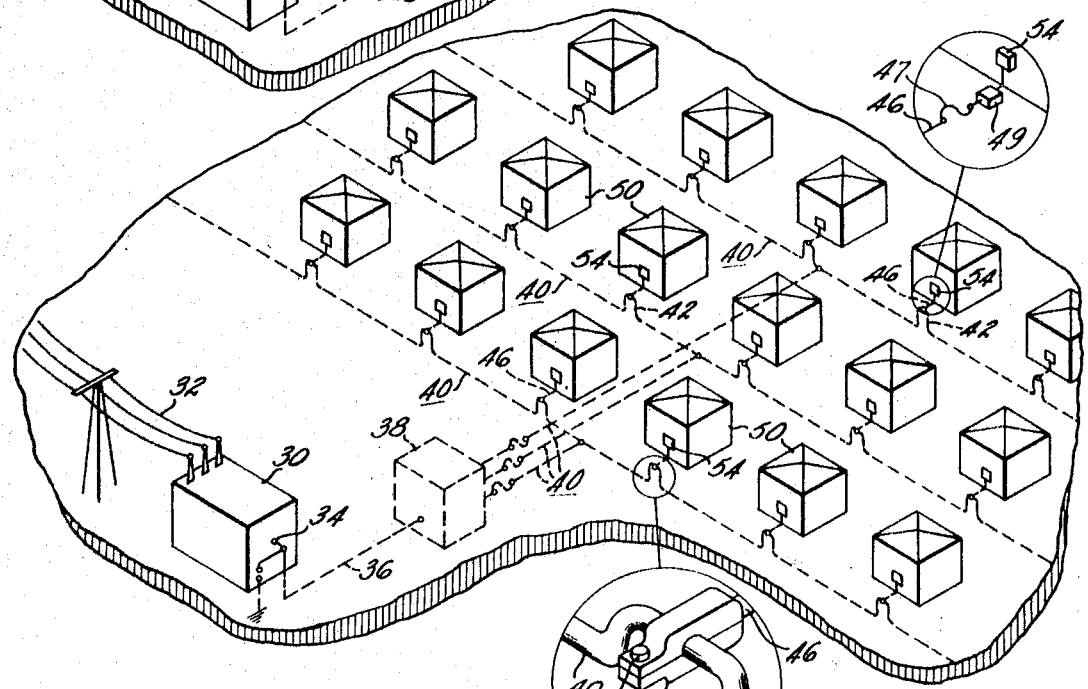
Figure 3:
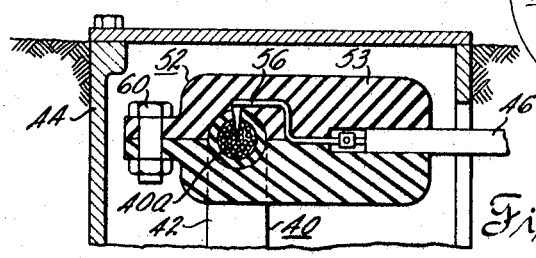

In the drawing:
FIG. 1 is a diagrammatic showing of a prior art URD system;
FIG. 2 is a diagrammatic showing of a URD system in accordance with the present invention; and
FIG. 3 is a cross sectional view of a cable connector used in the system.

The prior art

Referring to FIG. 1, there is shown a prior art URD system having an aboveground substation 10 which is fed by high voltage overhead alternating current power transmission lines 12. Substation 10 is provided with a multiphase output terminal 14 which, for example, supplies electrical power at 15 kv. A first underground insulated multiconductor cable 16 has one end connected to terminal 14 of substation 10 and has its other end connected to a conventional underground distribution transformer 18. As will be understood, transformer 18 is located in a suitable underground vault and is provided with the customary switching devices and fuses. In practice, transformer 18 could be located up to several thousand feet from the substation. Cable 16 is understood to be "plowed in" by means of well known machines designed for cable laying purposes and is normally disposed about three feet below the earth's surface. Transformer 18 is adapted to serve approxmiately eight houses and is conveniently located with respect to them. Transformer 18 effects a step down of voltage from 15 kv. to about 240 volts. A second underground insulated multiconductor cable 20 which is also "plowed in" has one end connected to transformer 18 and has its other end connected to a suitable electric service box 22 in house 24. In practice, transformer 18 is located not more than a few hundred feet from each house it serves. Transformer 18 is understood to be an existing type which is usually adapted to handle not more than eight houses. Therefore, if more houses in the same vicinity are to be served by substation 10, it is necessary to add another transformer such as 18, another cable such as 16 and the necessary cables 20.

The present invention

Referring now to FIG. 2, there is shown a URD system in accordance with the present invention. FIG. 2 shows an above-ground substation 30 fed by high voltage overhead alternating current power transmission lines 32. Substation 30 is provided with a multiphase output terminal 34 which, for example, supplies power at 15 kv.

An underground insulated multiconductor cable 36 has one end connected to terminal 34 of substation 30 and has its other end connected to an underground distribution transformer 38. Transformer 38 is understood to be located in a suitable underground vault and is provided with the customary switching devices and fuses. In practice, transformer 38 could be located up to several thousand feed from substation 30. Cable 36 is "plowed in," as hereinbefore explained. In accordance with the present invention, transformer 38 is adapted to serve a subdivision or portion thereof having approximately 50 to 150 dwelling units or homes and effects a step down of voltage from 15 kv. to about 2 to 5 kv. The voltage range of 2 to 5 kv. is selected because underground cable can be fabricated within this range to be free of corona discharge, have high current carrying capability and still be sufficiently strong and flexible to permit its being "plowed in." One or more underground cables 40, each having a conductor 40a (see FIG. 3) and meeting the characteristics just described, are connected to transformer 38 and are "plowed in" through the area to be served according to a pattern which suits the particular location of existing and proposed dwelling units to be served. In the particular embodiment shown, three cables 40 are employed.

In accordance with one aspect of the present invention, each cable 40 is laid so that portions 42 thereof loop upward close to the earth's surface wherever connections are to be made. A protective cap or cover 44, shown in FIG. 3, is set flush with the earth's surface and covers each looped portion 42 to protect cable 40 from damage and to indicate the optimum location for connecting a cable 46, hereinafter described, to it. However, cable 40 could be laid without the looped portions 42.

An other conductor cable 46, which is also "plowed in," is provided between cable 40 and each individual house, such as 50. One end of cable 46 is connected by means of a clamp-on connector 52, hereinafter described in detail, to cable 40. The other end of cable 46 is connected, as the inset to FIG. 2 shows, through a fuse 47 and a meter 49, to a transformer 54 which may be located closely adjacent to or even within a house 50. Transformer 54 is adapted to effect a step down from 2 to 5 kv. to about 240 volts for household purposes.

As FIG. 3 shows, the clamp-on connector 52 is provided with a member 56, which is electrically connected to the conductor of cable 46. The member 56 of connector 52 is adapted to pierce the insulated covering of cable 40 and to make electrical contact with the conductor 40a therein. Connector 52 is provided with a suitable insulated covering 53 and is adapted to mate with cable 40 in a watertight connection, as by means of a fastener 60, to preserve the insulated character of cables 40 and 46. The advantage of connector 52 is that cable 40 need not be prepared in advance to receive it, as by peeling off insulation.

The embodiments of the invention in which an exclusive property or privilege is claimed are defined as follows:

1. In an underground residential distribution system, a substation, an underground transformer located in the vicinity of a plurality of buildings, a first underground cable connected between said substation and said underground transformer, at least one second underground cable connected to said underground transformer and disposed in the vicinity of said buildings, a transformer for each building, at least one third underground cable connected between said second cable and one of said transformers of said buildings, and a clamp-on connector on said third cable connecting said third cable to said second cable.

2. A system according to claim 1 wherein said second cable has at least one looped portion which loops upward toward the earth's surface at predetermined position therealong with respect to a building to facilitate making a connection thereto and including a removable cover disposed in the earth over said looped portion to protect the latter.

3. A system according to claim 1 wherein said substation has an output of about 15 kv. and wherein said underground transformer has a step-down ratio of about 15 kv. down to a range between about 5 kv. to 2 kv.

4. In an underground residential distribution system, a substation having an output of about 15 kv., an underground transformer located in the vicinity of a subdivision adapted to contain about 50 to 150 buildings, said underground transformer having a step-down ratio of about 15 kv. down to a range between about 5 kv. to 2 kv., a first underground insulated cable connected between said substation and said underground transformer, at least one second underground insulated cable connected to said underground transformer and disposed in the vicinity of existing and proposed buildings in said subdivision, a second transformer for each existing building having a step-down ratio of about 5 kv. to 2 kv. down to 240/120 volts, at least one third underground insulated cable, said third cable connected between said second cable and one of said second transformers, and a clamp-on connector on each of said third cables connecting each of said third cables to said second cable, said clamp-on connector having conductive means piercing the insulation on said second cable.

5. A system according to claim 4 wherein said second cable has looped portions which loop upward toward the earth's surface in the vicinity of each existing or proposed building in said subdivision to facilitate making electrical connections thereto and including a removable cover disposed in the earth above at least some of said looped portions to protect the latter.

References Cited
UNITED STATES PATENTS

| | | |
|---|---|---|
| 165,535 | 7/1875 | Brooks. |
| 342,552 | 5/1886 | Westinghouse _____ 307—17 |
| 1,290,153 | 1/1919 | Fitzpatrick. |
| 2,534,881 | 12/1950 | Schroeder. |
| 2,785,319 | 3/1957 | Simpson et al. _____ 307—147 |

LARAMIE E. ASKIN, Primary Examiner

U.S. Cl. X.R.
174—37; 307—83; 339—97